Feb. 19, 1924.   J. A. B. SMITH   1,484,196
TYPEWRITING MACHINE
Filed Feb. 15, 1923

Inventor:
Jesse A. B. Smith
by D. C. Stickney
Attorney

Patented Feb. 19, 1924.

1,484,196

UNITED STATES PATENT OFFICE.

JESSE A. B. SMITH, OF STAMFORD, CONNECTICUT, ASSIGNOR TO UNDERWOOD TYPEWRITER COMPANY, OF NEW YORK, N. Y., A CORPORATION OF DELAWARE.

TYPEWRITING MACHINE.

Application filed February 15, 1923. Serial No. 619,088.

*To all whom it may concern:*

Be it known that I, JESSE A. B. SMITH, a citizen of the United States, residing at Stamford, in the county of Fairfield and State of Connecticut, have invented certain new and useful Improvements in Typewriting Machines, of which the following is a specification.

This invention relates to means for causing the paper-carriage or other letter-feeding carriage of a typewriter to skip one space automatically at a predetermined point in the line of writing.

This method of operation is desired, for example, in typing bills, where, after writing the last figure in one column, it is desired that the carriage should jump into position to write the first figure in the next column, without incurring the necessity for the operator to depress a tabulator-key or give the matter any other attention.

An object of the invention is to secure this result in a machine in which the usual carriage-feeding dogs engage the teeth of an escapement wheel. In such a case, the result cannot be secured by merely omitting one of the teeth of the escapement wheel, inasmuch as said wheel makes a complete revolution many times during a single run of the typewriter-carriage, and hence skippings would occur undesirably at frequent intervals along the line of typing.

In order to secure the desired result at only the desired point in the line of typing, and at the same time preserve the well-known advantages resulting from the use of an escapement wheel, the present invention provides for a certain mutilating of the rack, which in said machines usually drives the pinion that revolves the escapement wheel.

The teeth of said rack are formed at letter-space intervals, and the teeth of said pinion are formed so that the pinion turns a distance of exactly one tooth for each letter-feeding of the typewriter-carriage. The pinion is of such size that two of its teeth are always in mesh with the rack. But the rack has to do only with these two pinion-teeth when the carriage is stationary, because in practising the present invention, the rack, pinion, escapement wheel and feed-dogs may be so placed that normally the rack-teeth clear those teeth upon the pinion which flank the meshing teeth thereof.

According to the present invention, the difficulty of causing the carriage to skip only a single extra space when the carriage-rack necessarily engages two of the pinion-teeth, is overcome by cutting away two succeeding teeth of the rack. Hence at the operation of the type-key and the carriage-feeding dogs, the escapement wheel is permitted to turn one notch, and the rack tooth which borders the gap at one side is permitted to escape from the pinion, and the rack then advances until the tooth at the other end of its gap engages the next tooth but one upon the pinion. This limits the jump to two letters-spaces, i. e., one extra letter-space (in addition to the normal letter-spacing). Thereupon the typing may proceed and the carriage feeds a single letter-space at each type stroke in the usual manner. The excess length of the gap, that is, the cutting away of two teeth for producing only a single extra letter-feed, overcomes the difficulty that two of the rack-teeth normally mesh with the pinion while it is desired for the rack to jump only one extra step.

Other features and advantages will hereinafter appear.

In the accompanying drawings.

Figure 1:
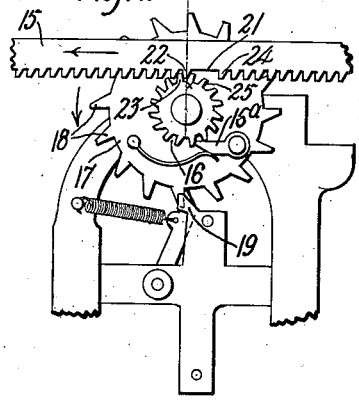
Figure 1 is a front elevation of an Underwood typewriter carriage-rack which is driven in the usual manner in the direction of the arrow, the movements of the carriage being controlled by pinion, escapement wheel and feed dogs. This figure shows the rack at its last station prior to taking the jump, which is to include both the ordinary feed and one extra feed of the carriage.
Figure 2:
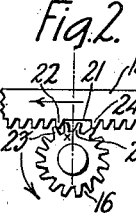
Figure 2 shows the jump in progress.
Figure 3:
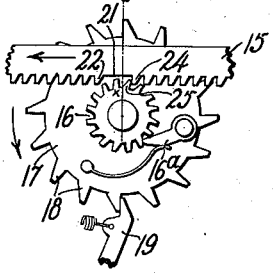
Figure 3 shows the positions of the parts at the completion of the jump.
Figure 4:
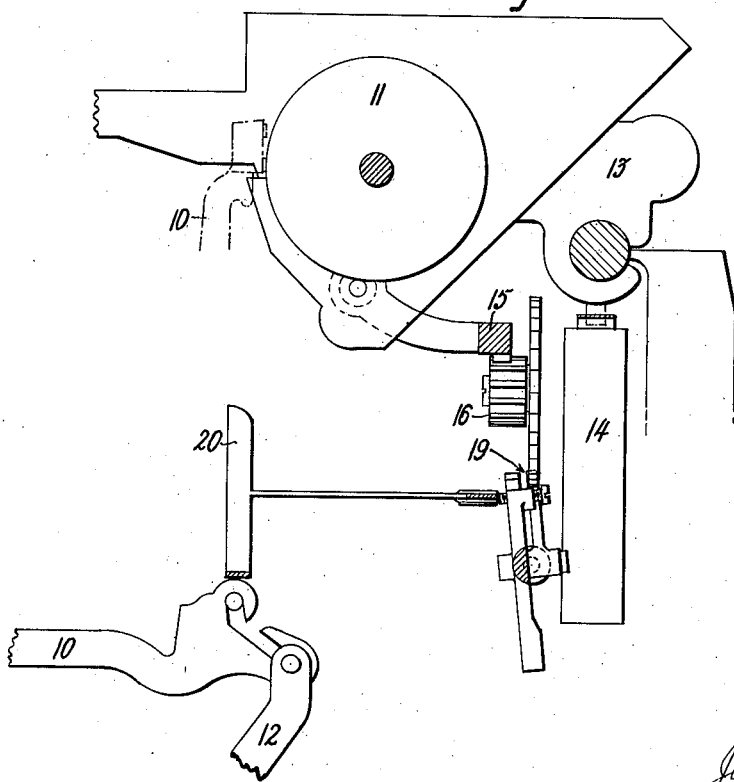
Figure 4 is a diagrammatic elevation of the typewriter carriage, and its driving spring, showing the manner of feeding the carriage at the key strokes.

The usual type-actions comprise type-bars 10 which swing up to strike against the front of a platen 11; the type-bars being connected to key-operated levers 12, and the platen being mounted upon a carriage 13 which is propelled by a spring-barrel 14 towards the left at Figures 1, 2 and 3. The rack 15 upon the carriage meshes with pinion 16 to drive the same, the pinion being of such size that two of its teeth normally mesh with the rack; and the pinion is connected in the usual manner by a spring-pawl 16ª to an escapement wheel 17 having widely-separated teeth 18. With said escapement wheel co-operate escapement dogs 19 which are caused to vibrate at every key-stroke, being for this purpose controlled by a universal bar 20 which is operated by the type-bars 10 in the usual manner. The rack 15 at the required point is mutilated by cutting away two succeeding teeth, thus forming a gap 21. The tooth in advance of the gap is marked 22, and is seen at Figure 1 engaging tooth 23 of the pinion and co-operating with the pinion, escapement wheel and dogs to hold the carriage steady for the typing operation.

Usually upon the release of the type-key and the return of the universal bar 20, the escapement wheel 17 is permitted by the dogs 19 to move one space, and hence the pinion 16 is permitted to rotate so far as to permit said tooth to advance one tooth-space. But as rack tooth 22, at one end of the gap, stands in engagement with the pinion, and the pinion 16 is fed one step, and the rack consequently advances to the point seen at Figure 2, said tooth 22 becomes entirely clear of the pinion, and the rack therefore is no longer restrained by pinion-tooth 23. Owing to the gap, there is no rack tooth to engage the next pinion tooth (marked with a cross). At this moment the parts are in the Figure 2 position, the carriage having advanced a letter-space, but being free to advance farther. The spring-barrel 14 therefore at this time operates to advance the carriage through more than the normal feeding distance, that is, until the rack tooth 24 at the terminus of the gap engages a tooth 25 upon the pinion, as at Figure 3. It will be seen that, according to this operation, the pinion-tooth that is marked with a cross performs no function, as it is skipped. Said tooth marked with a cross is in the nature of an obstacle, which is avoided by increasing the length of the rack gap to the extent of an additional tooth, so that the rack-tooth 24 that is finally arrested by the pinion-tooth shall be three spaces from the original rack-tooth 22, thereby arresting the carriage when it has advanced only two letter-spaces from the Figure 1 position, that is, when it has made an extra jump of only one point. It will be seen that, according to this invention, it is only necessary, in providing for the skipping of the carriage, to make the gap in the rack an extra length, the excess in any case being equal to one tooth of the rack. In this manner a jump of three, four or more letter-spaces may also be provided.

Variations may be resorted to within the scope of the invention, and portions of the improvements may be used without others.

Having thus described my invention, I claim:

In a typewriting machine, the combination with a spring-driven letter-feeding carriage having a rack whose teeth are at letter-space intervals, of a pinion meshing with said rack, an escapement wheel driven by said pinion, and a key-controlled dog device co-operating with said escapement wheel, said pinion having two teeth normally in mesh with said rack, and said rack having a gap to permit a jump of the carriage, said gap being lengthened by the omission therefrom of one tooth in excess of the number of letter-spaces that the carriage jumps, so that the rack in re-engaging the pinion engages the tooth thereof which is next but one to the tooth that was last in engagement with the rack.

JESSE A. B. SMITH.

Witnesses:
 EDITH B. LIBBEY,
 JENNIE P. THORNE.